United States Patent
Kovacich et al.

(10) Patent No.: US 6,442,812 B1
(45) Date of Patent: Sep. 3, 2002

(54) METHOD OF MANUFACTURING A PIEZOELECTRIC TORQUE SENSOR

(75) Inventors: John A. Kovacich, Wauwatosa; Wayne S. Kaboord, Mequon; Fred J. Begale, Oconomowoc; Robert R. Brzycki, Hartland; Birger Pahl, Milwaukee; James E. Hansen, Oak Creek, all of WI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/517,828

(22) Filed: Mar. 2, 2000

(51) Int. Cl.⁷ .......................... H04R 17/00; H01L 41/18
(52) U.S. Cl. ........................ 29/25.35; 29/621.1; 29/855; 29/841; 29/407.02; 156/293; 310/338; 310/344; 73/721; 73/862.321; 73/862.325
(58) Field of Search ................ 29/593, 595, 25.35, 29/621.1, 25.41, 855, 841, 407.01, 407.02, 407.05, 407.06, 557; 156/293; 310/338, 344, 345, 319; 73/862.321, 862.325, 862.338, 862.339, 721

(56) References Cited

U.S. PATENT DOCUMENTS

| 3,858,440 A | | 1/1975 | Budraitis | 73/782 |
|---|---|---|---|---|
| 4,312,241 A | | 1/1982 | Budraitis | 73/862.325 |
| 4,649,758 A | * | 3/1987 | Harbour | 73/862.325 |
| 4,835,436 A | | 5/1989 | Lew | 310/338 |
| 5,205,176 A | * | 4/1993 | Kibblewhite | 29/25.35 |
| 5,585,571 A | * | 12/1996 | Lonsdale et al. | 73/862.325 |

FOREIGN PATENT DOCUMENTS

| GB | 2 225 854 A | | 6/1990 |
|---|---|---|---|
| JP | 5-332855 | * | 12/1993 |

OTHER PUBLICATIONS

Hammond et al, A Non–Contact Piezoelectric Torque Sensor, IEEE International 1998 Proceedings, Frequency Control Symposium, pp. 715–723.*

* cited by examiner

Primary Examiner—Peter Vo
Assistant Examiner—A. Dexter Tugbang
(74) Attorney, Agent, or Firm—Roger A. Johnston

(57) ABSTRACT

A method of manufacturing a piezoelectric torque transducer is provided, comprising the steps of (a) forming a prepared area on a surface of a torsion member adapted to be strained by an applied torque; (b) providing a piezoelectric element having an axis of maximum strain sensitivity and disposing first and second electrodes on opposite faces of the element, respectively, and attaching an electrical lead to each electrode; (c) connecting electrical leads to the electrodes; and (d) disposing the element on the prepared area and orienting the axis of maximum strain sensitivity on the member and securing the element to the prepared area with a material selected from a group consisting of (i) adhesive material and (ii) potting material. The step of disposing the piezoelectric element includes configuring the piezoelectric element in a plate-shaped configuration and disposing a resilient annular member on each opposite face of the plate-shaped element and overlaying each of the annular members with a protective cover.

11 Claims, 6 Drawing Sheets

METHOD OF MANUFACTURING A PIEZOELECTRIC TORQUE SENSOR

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to torque sensors and particularly transducers for providing an electrical signal indicative of the changes in torsional strain which a torsion member undergoes when subjected to a varying applied torque or moment. Such sensors and particularly transducers for sensing torsional strain are particularly desirable in systems where a shaft is subjected to varying torque during operation of the system including static, quasi-static and dynamic torque variation. Such applications include steering shafts for motor vehicles and rotor shafts in motors or power transmission shafts.

Heretofore, torque transducers for shafts have employed magneto elastic elements positioned on the shaft and sensing coils for detecting the change in the magnetic field as the magneto elastic element has been subjected to torsional strain. However, the difficulties in attaching the magneto elastic element to the shaft in a manner which could reliably transmit the shaft strain to the magneto elastic element created problems which rendered mass production of the device prohibitive.

A known transducer employing a piezoelectric element is that employing a piezoelectric element mechanically constrained and electrically connected to receive the output of the piezoelectric element upon the transducer being subjected to high impulse loads. Such a device is shown and described in U.S. Pat. No. 4,835,436 issued to H. S. Lew and is unsuitable for applications where a low torsional strain rate and/or low magnitude torque is applied to the torsion member, and is particularly not suitable for automotive steering shaft applications.

In quasi-static applications such as for an automotive steering shaft, it has further been desired to provide an electrical indication of the angular movement of the shaft; and, heretofore this has required a separate angle position sensor.

Thus it has long been desired to provide a way or means of sensing and providing an electrical indication of torsional strain in a member subjected to an applied torque in a manner that provides a high degree of sensitivity and relatively high resolution of the electrical signal output in response to changes in the torsional strain on the member. It has further been desired to provide such a torque sensor or transducer which provides an electrical indication of rotary angular position, which is easy to manufacture and install in high volume mass production and which is robust in service and relatively low in manufacturing cost.

BRIEF SUMMARY OF THE INVENTION

The present invention provides a torque sensor or transducer which provides a continuous electrical indication of the torsional strain which a member undergoes when subjected to an applied torque. The transducer of the present invention employs a piezoelectric element potted onto a prepared area of the torsion member to be strained; and, the piezoelectric element is capacitively coupled via a rotary capacitor to an external detection circuit employing an oscillator. The rotary capacitor has a variable capacitance for indicating the angular deflection thereby eliminating the need for a separate angular position sensor. The piezoelectric element has the electrodes thereof covered and resilient dielectric spacers provide an air gap between the electrodes and the cover forming a subassembly to improve the signal output of the sensor at its resonant frequency. The piezoelectric element subassembly is secured to the prepared area preferably a recess, by a strain transmitting potting medium. In the presently preferred practice, the detection circuit includes an oscillator and detects changes in the resonant frequency of the piezoelectric element as a measure of the strain to which the torsion member is subjected.

The present invention provides a simple to manufacture and robust piezoelectric torque transducer which is relatively low in cost and easy to manufacture in high volume production and is particularly suitable for attachment to a quasi-statically strained element as, for example, a vehicle steering shaft or to a rotating shaft such as a rotating power transmission shaft or motor shaft.

DETAILED DESCRIPTION OF THE INVENTION

Figure 1:
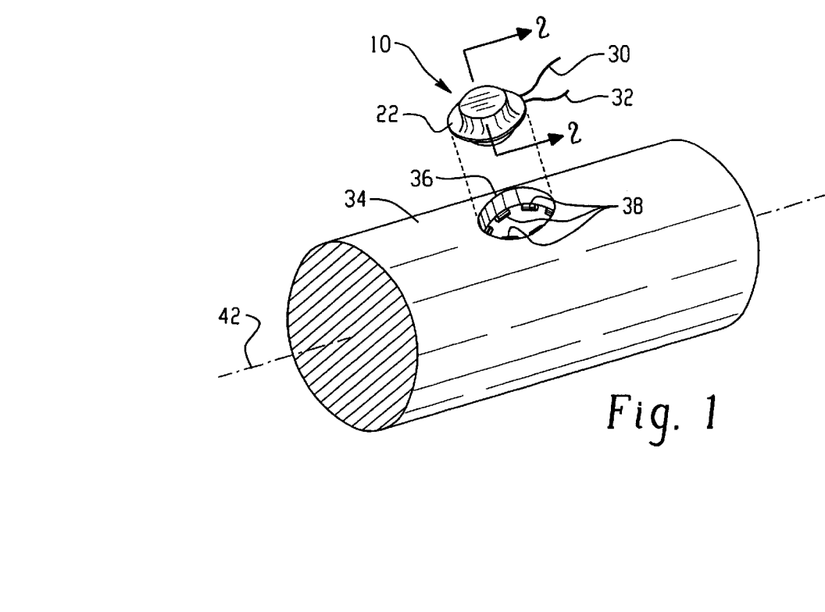
FIG. 1 is an axonometric view of the transducer of the present invention installed on a torsion member.
Figure 2:
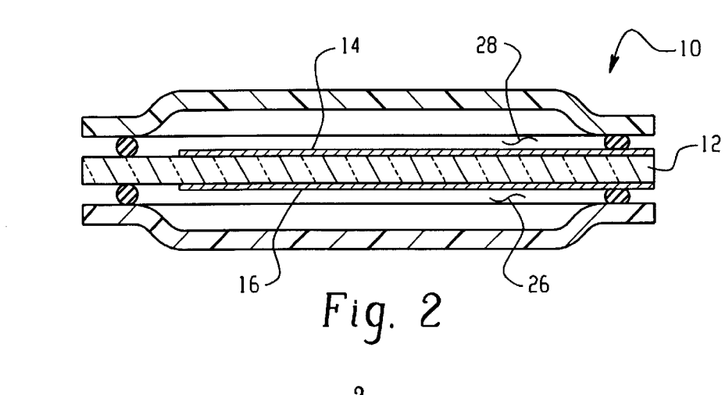
FIG. 2 is a section view taken along section-indicating lines 2—2 of FIG. 1.
Figure 3:
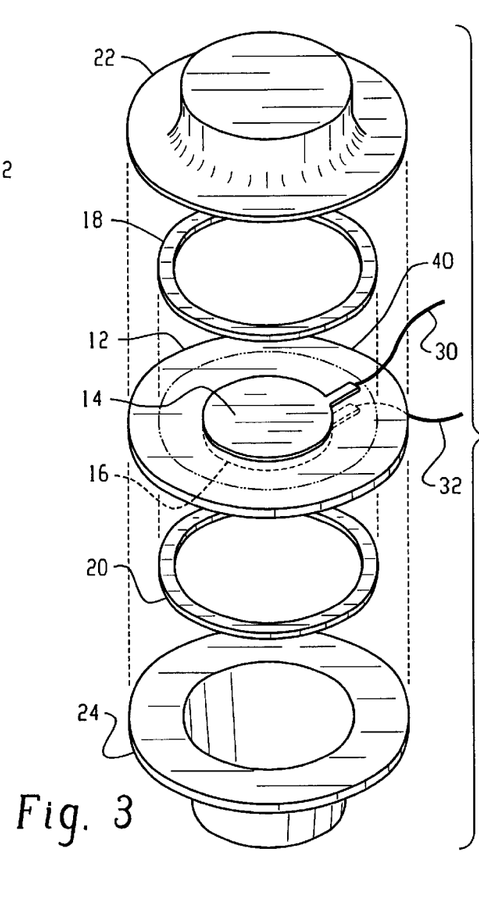
FIG. 3 is an exploded view of the transducer of FIG. 1.

Referring to FIGS. 1 through 3, a transducer subassembly indicated generally at 10 and includes a piezoelectric crystal element 12 having a pair of electrodes 14, 16 in the form of plates or disks formed on opposite faces of the crystal 12 as, for example, by ion sputtering of conductive material thereon. In the present practice of the invention the electrodes are formed of gold material; however, it will be understood that other suitable conductive materials may be used. A pair of resilient annular dielectric spacers 18, 20 are disposed on opposite sides of the element 12; and, a cover member 22, 24 is disposed over each of the spacers and electrodes and registers against respectively one of the spacers 18, 20 to define an air gap 26, 28, above each of the electrodes 14, 16. In the presently preferred practice, the annular spacers 18, 20 are formed of elastomeric material; and, in particular, fluorosilicone elastomer has been found satisfactory provided that the hardness does not exceed 70 Durometer on the Shore "A" scale. The cover members 22, 24 may be formed out of suitable plastic or metallic material. The assembly 10 may be held together temporarily by suitable adhesive, as for example, a spray tack material. An electrical lead 30, 32 is attached respectively to each of the electrodes 14, 16, preferably by weldment such as, for example, by soldering.

Referring to FIG. 1, a torsionally strained element 34 has a recess 36 formed therein which comprises the prepared area into which the subassembly 10 is received and supported from the bottom thereof by suitable spacers denoted by reference numeral 38. The subassembly 10 is then potted in place in recess 36 by a suitable strain transmitting potting compound such as, for example, epoxy resinous material. In the present practice of the invention, Bisphenol A resin with cyclohexylamine or hexahydrophthalic hardener type epoxy material having an upper service temperature limit of about 500° F. and a modulus of elasticity, preferably of at least $5.6 \times 10^8$ PA at 150° C. with a glass transition temperature preferably of at least 150° C. have been found satisfactory; however, it will be understood that other potting materials may be employed as the strain transmitting medium. It will be understood that the edges of the piezoelectric crystal element 12 are in direct contact with the potting material for strain transmission therebetween. In the present practice of the invention, it has been found satisfactory to form the spacers 38 from ceramic material. The subassembly 10 is disposed centrally with respect to the prepared area 36.

In the present practice of the invention, the piezoelectric element 12 has the axis of maximum strain sensitivity identified by a flat surface 40 on the periphery thereof which is employed for orienting the subassembly 10 with the edge 40 disposed at an angle of about 45 degrees to the longitudinal axis of the torsion member 34; or, to the axis of the torque to be applied to the member 34, which axis is denoted by reference numeral 42 in FIG. 1. Upon installation of the subassembly 10 into recess 36, the recess is filled with the potting compound which, upon hardening or curing is of sufficiently high modulous of elasticity to transmit strain in the torsion member 34 to the crystal element 12.

In the present practice of the invention, the torsion member is formed of medium carbon steel such as SAE 1045 steel and has a diameter of about 0.75 inches (19 mm); and, the recess 36 is in the form of a flat bottom counter bore having a diameter of about 0.60 inches (15.2 mm) and a depth of about 0.28 inches (7.1 mm). However, it will understood that the particular size of the torsion member 34 and the transducer element may be varied in accordance with the practice of the invention in which the diameter of recess 36 is about 80% of that of the diameter of the torsion member 34.

Figure 4:
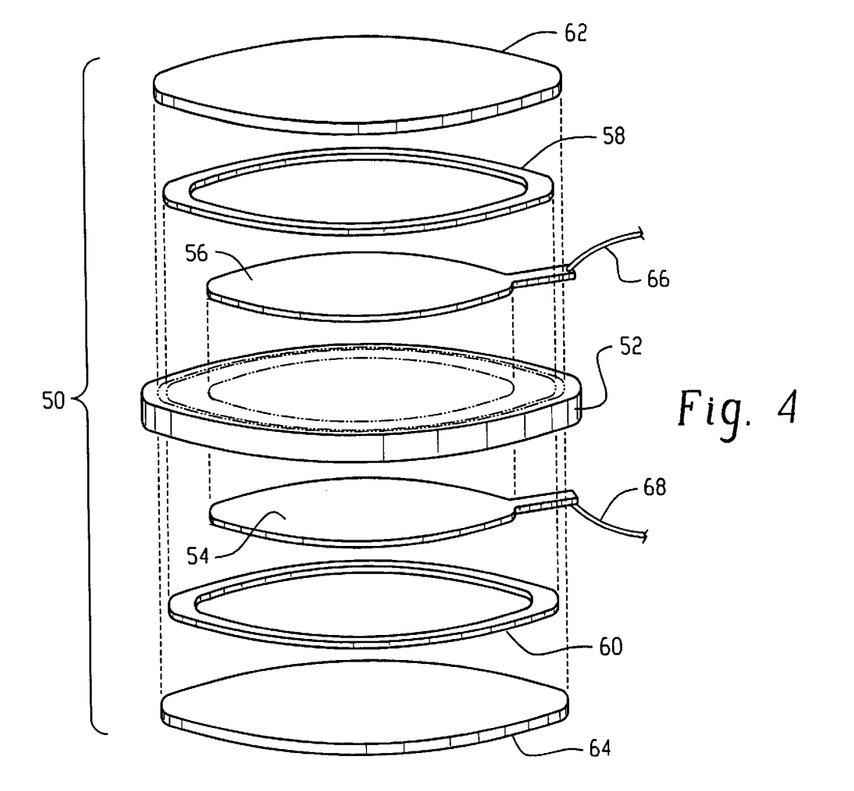
FIG. 4 is an exploded view of another embodiment of a transducer.

Referring to FIG. 4, an alternate embodiment of the transducer subassembly is indicated generally at 50 and includes a piezoelectric crystal element 52 preferably having a generally disk-shaped configuration having electrode layers 54, 56 deposited on opposite faces thereof. The embodiment of FIG. 4 has resilient annular spacers 58, 60 disposed over the electrodes 54, 56; and, the spacers 58 have a generally rectangular cross-section or gasket-like configuration. A pair of flat disk-like or wafer configured covers 62, 64 are disposed respectively over the spacers 58, 60 defining an air gap respectively between the faces of the electrodes 56, 54 and the inner surface of the covers 62, 64.

Figure 5:
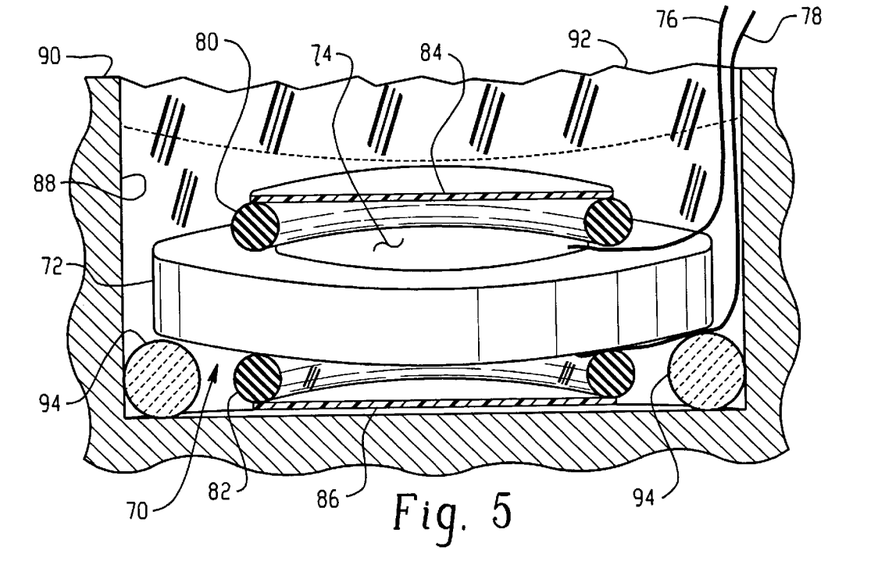
FIG. 5 is a cross-section of another embodiment of the transducer installed on a torsion member.

Referring to FIG. 5 another embodiment of the invention is illustrated in which a transducer subassembly indicated generally at 70 has a piezoelectric element 72 with a generally disk-like configuration having electrodes deposited on opposite surfaces thereof, one of which is illustrated in FIG. 5 and denoted by reference numeral 74 and which have respectively electrical leads 76, 78 attached thereto. A pair of annular resilient spacers 80, 82 are disposed over the electrodes and a thin wafer-like cover 84, 86 is disposed over each of the spacers 80, 82 respectively. The subassembly 70 is received in a recess 88 formed in a torsion member 90; and, the recess is filled with a suitable strain transmitting potting material 92. The subassembly 70 is spaced from the bottom of the counterbore 88 by suitable spacers 94 disposed thereabout. In the present practice of the invention, it has been found satisfactory to form the spaces 94 of ceramic material.

Figure 6:
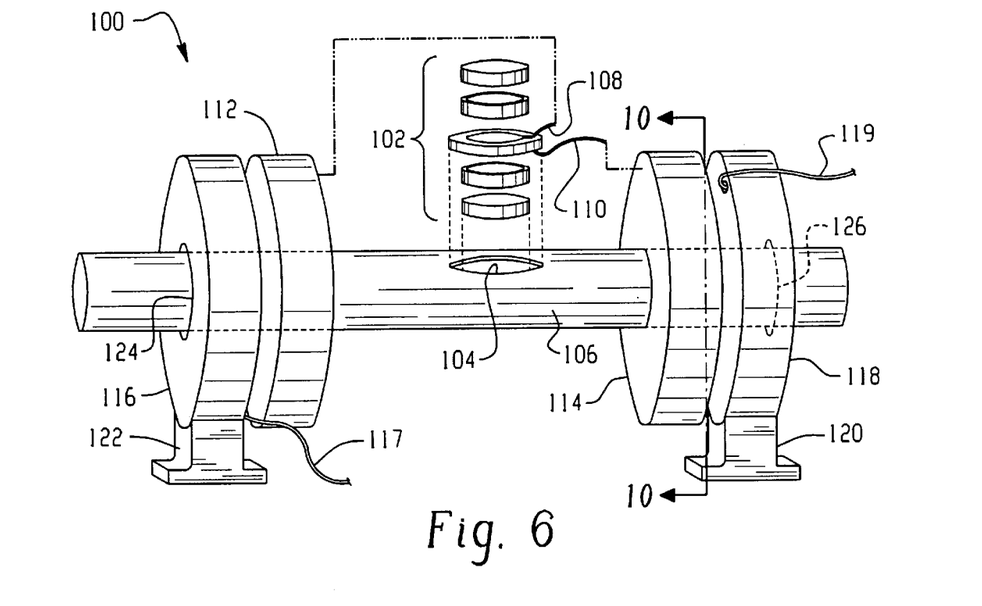
FIG. 6 is a pictorial representation of the transducer installed with capacitive coupling.

Referring to FIG. 6, the torque sensor assembly of the present invention is indicated generally at 100 and includes a transducer subassembly 102 installed in a recess 104 provided in a torsion member 106. If desired, the transducer subassembly 102 may comprise any of the configurations of subassemblies 10, 50, or 70 and which is potted in prepared area by strain transmitting potting (not shown in FIG. 6).

The transducer subassembly 102 has electrical leads 108, 110 extending from the potting material and lead 108 is attached to a capacitor plate 112 mounted on torsion member 106 and disposed axially spaced on one side of the subassembly 102. The remaining lead 110 is connected to an oppositely disposed capacitor plate 114 provided axially spaced on the side of the subassembly 102 opposite plate 112. It will be understood that plate 114 is similarly mounted on the torsion member 106 for movement therewith.

A second pair of stationary capacitor plates are provided, with one plate disposed concentrically about the torsion member 106 and spaced axially closely adjacent plate 112 as denoted by reference numeral 116. Plate 116 has an electrical lead 117 connected to the electrode surface thereof. The other plate 118 of the pair is disposed in axially closely spaced arrangement with respect to plate 114. Plate 118 is supported externally of the torsion member 106 by a support structure or base 120 and has an electrical lead 119 connected to the electrode surface of plate 118 for external circuit connection. In similar fashion, plate 116 is supported externally of torsion member 106 by a support structure 122. Plate 116 is illustrated with a clearance hole 124 which has the torsion member 106 received therethrough in full clearance arrangement such that member 106 may be freely rotated with respect thereto. It will be understood that plate 118 likewise has a clearance hole formed centrally therethrough as shown in dashed outline in FIG. 6 and denoted by reference numeral 126 such that member 106 may be freely rotated with respect to plate 118. If desired, for additional circuit capacitance, a plurality of capacitive coupling plate pairs may be employed.

Figure 7:
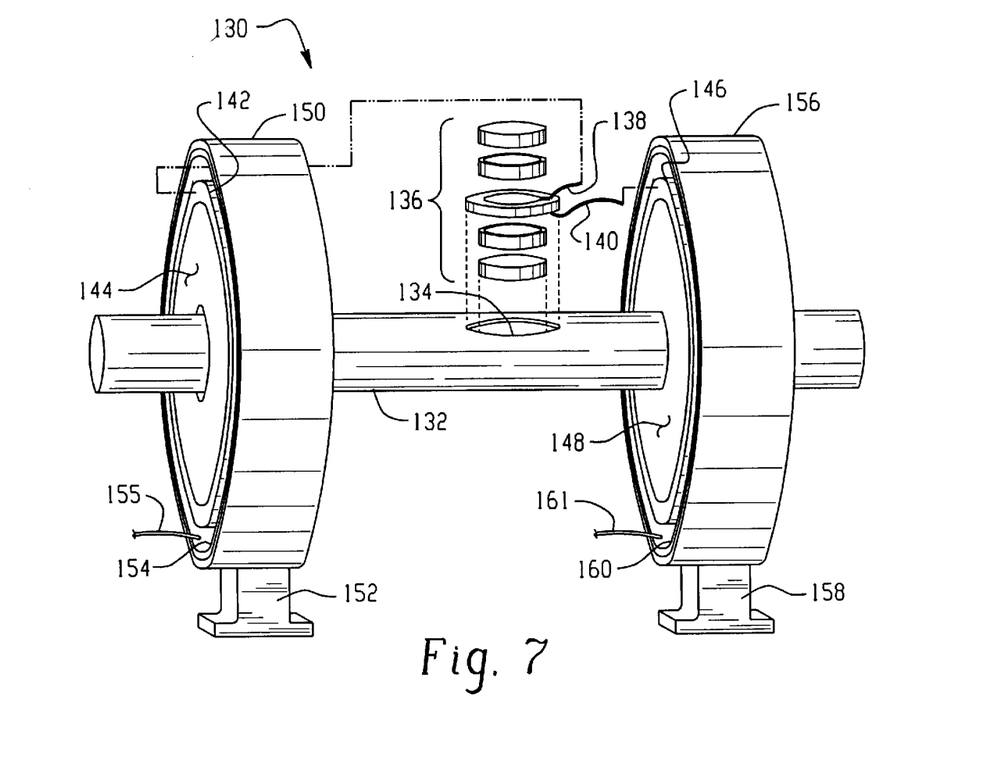
FIG. 7 is an alternate arrangement of the embodiment of FIG. 6.

Referring to FIG. 7, another embodiment of a system employing the torque transducer of the present invention is indicated generally at 130 and includes a torsionally strained member 132 which has a recess 134 therein with a torque transducer subassembly 136 having electrical leads 138, 140 attached thereto and extending therefrom with the subassembly 136 received in recess 134 and potted therein with a strain transmitting potting material (not shown).

Electrical lead 138 is connected to a cylindrical electrode layer 142 provided on a circular plate 144 attached to the torsion member 132. A second cylindrical electrode 146 is disposed on a plate 148 attached to torsion member 132 and located axially spaced from recess 134 on a side opposite the plate 144. An outer annular support member or ring 150 is supported by an external stationary support structure 152 and has a second cylindrical electrode 154 provided on the inner periphery thereof which electrode 154 is disposed in radially spaced arrangement of the electrode surface 142 at the same axial station along torsion member 132 such that electrodes 142 and 154 form a capacitor. Plate electrode 154 has an electrical lead 155 connected thereto for external circuit connection.

A second annular support structure or ring 156 is disposed at the same axial station as electrode surface 146 and is supported by a stationary supporting base 158. Annular structure or 156 has an electrode plate or surface 160 disposed about the inner periphery thereof which is radially spaced from the electrode surface 146 and forms an annular capacitor therewith. Electrode surface 160 also has an electrical lead 161 connected thereto for external circuit connection.

Figure 8:
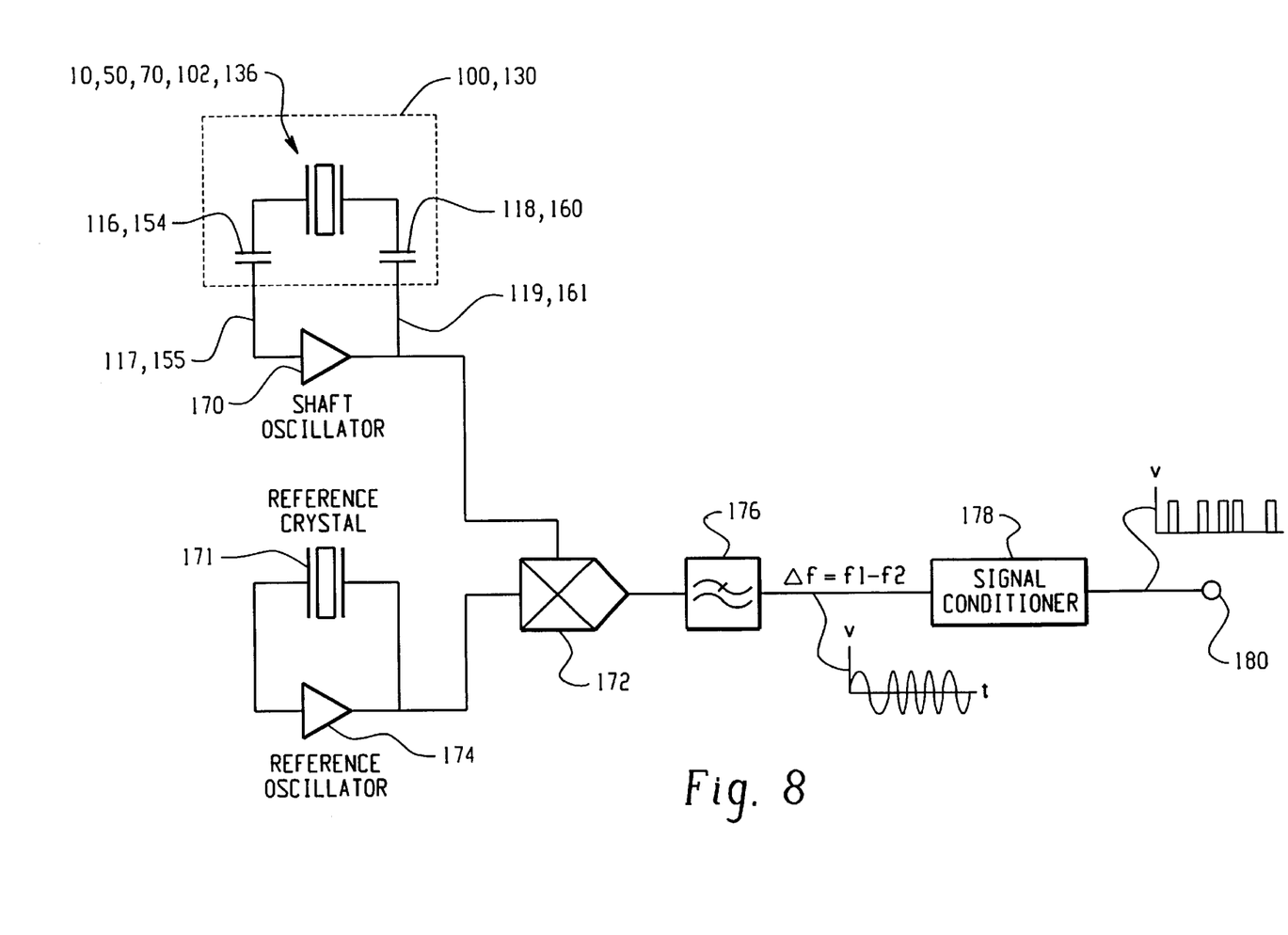
FIG. 8 is a block diagram of the electrical circuitry of the system employing the transducer of the present invention.

Referring to FIG. 8, a block diagram of the electrical detection system employed for the present invention indicates that the installation of the torque transducer on the torsion member and capacitive coupling at 100, 130 as comprising any of the subassemblies indicated generally at 10, 50, 70, 102, 136 and has the stationary capacitive plates 116, 154 and 118, 160 respectively connected respectively by leads 117, 155 and 119, 161 to an oscillator 170 which has its output connected to one input of a mixer 172. Mixer 172 receives at its other input a signal from the output of a reference oscillator 174 which has a reference piezoelectric element connected thereto. The output of the mixer 172 is fed through a low pass filter 176 which filters out the heterodyne frequencies and provides a signal comprising the difference between the outputs of the drained strained piezoelectric element and the reference piezoelectric element 171 which signal is fed through a signal conditioner 178 which converts the signal to a series of pulses at the output 180 thereof.

Figure 9:
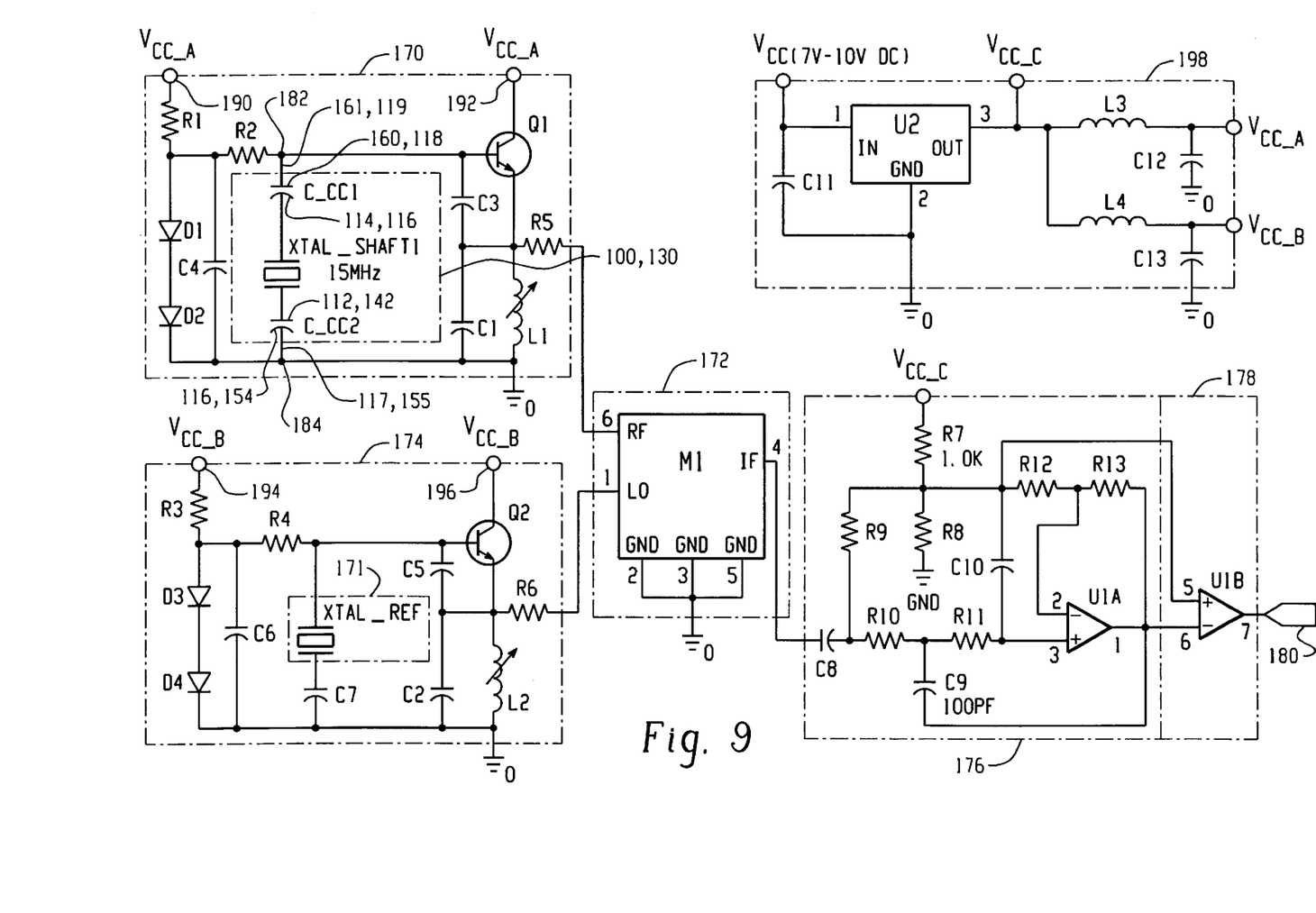
FIG. 9 is an electrical schematic of the system for the installed transducer of the present invention.

Referring to FIG. 9, the transducer 100, 130 provides outputs through rotary capacitor CC1 which comprises plates 118, 160 and capacitor CC2 which comprises plates 116, 154 and plates 112, 142. The outputs, from plates 160, 118 and 116, 154 are connected to input terminals 182, 184 of oscillator 170. The oscillator 170 utilizes resistors R1, R2 and capacitors C1–C3 and diodes D1 and D2 connected to the base of switch Q1 which has its output connected to L1 and through R5 to one input of the mixer 172.

A reference piezoelectric element or crystal 171 is connected to input terminals 186, 188 of the reference oscillator 174 which comprises diodes D3, D4 and resistors R3, R4 and capacitors C2, C5–C6 connected to the base of switch Q2 which has its output connected to L2 and through R6 to the other input of mixer 172.

Oscillator 170 receives a supply voltage $V_{CC}$ from power supply 198 at terminals 190, 192; and, oscillator 174 is powered by $V_{CC}$ at terminals 194, 196 from the power supply 198 which has voltage outputs $V_{CC}$ A, B, C and comprises device U2, coils L3, L4 and capacitors C11, C12 and C13.

Mixer 172 provides an input to the low pass filter circuit 176 which comprises capacitor C8, resistor network R7 through R13 and capacitor C10 and device U1A. The filter network 176 provides inputs to comparator U1B for conditioning the signal to a series of positive frequency modulated pulses at the output 180 thereof. The change in frequency of the mixer output is thus an indication of the change in torsional strain in the torsion element. Values of the circuit components are set forth in Table I below.

TABLE I

| Capacitor | µFd | | Resistor | Ohms | Device | Type |
|---|---|---|---|---|---|---|
| CC1–2 | 15 | PF | R1, 4 | 390 | D1–4 | 1N 148 |
| C1, 2, 9, 10 | 100 | PF | R2, 4 | 130K | Q1, 2 | 2N 3904 |
| C3, 5 | 47 | PF | R5, 6 | 1K | U1A, 1B | MC34072 |
| C4, 6 | 0.1 | | R7, 8 | 1.0K | U2 | 78L05 |
| C7 | 47 | PF | R9 | 10K | MXR | SRA-1 |
| | | | | | | (Micro Circuit) |
| C8 | 0.22 | | R10, 11 | 1.15K | L3, 4 | 4.7 µH |
| C11–13 | 0.33 | | R12 | 39.2K | MI | SRA-1 |
| | | | R13 | 37.4K | XTAL | NE 612 |
| | | | | | | (Phillips) |

Operationally, the piezoelectric elements 100, 130 and the reference element 171 are placed in the feedback loops of separate oscillators, respectively 170, 174; and, the change in properties of the piezoelectric elements under torsional strain will cause a corresponding shift in the output frequency. The frequency of the reference oscillator 174 is chosen close to that of the unstressed transducer piezoelectric element such that there is an offset between the two frequencies. The output of both oscillators 170, 174 are fed into the mixer 172 which produces the heterodyne frequencies comprising the sum, difference and product of the oscillator outputs. Mixer 172 passes only the difference of the two oscillator outputs. The reference oscillator 174 is tuned such that there is an offset with the output of oscillator 170 at zero torsional strain on the piezoelectric element. The advantage of the arrangement of the present invention is that only a low frequency signal in the kilohertz range need be processed; and, thus the cost of the circuit is minimized. In the present practice of the invention the piezoelectric element has a resonant frequency of about 5 megahertz and the oscillators have a frequency of about 15 megahertz. The change in frequency of the piezoelectric crystal element is then easily detected with inexpensive circuitry.

Figure 10:
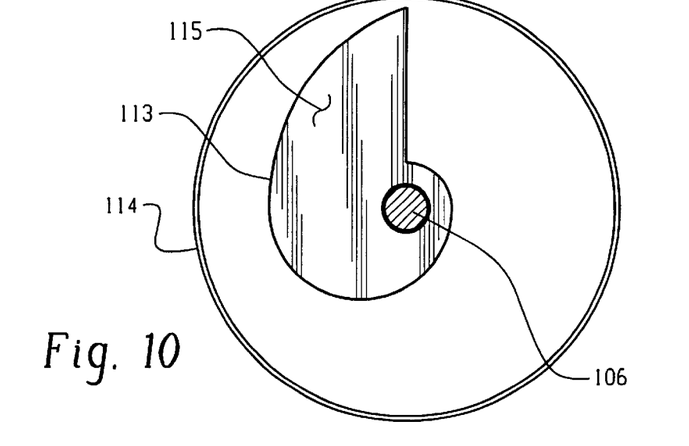
FIG. 10 is a section view taken along section indicating line 10—10 of FIG. 6 of the capacitive coupling electrodes providing angular position.

Referring to FIG. 10, the rotary capacitive plate 114 is shown as having the electrode surface 115 thereon configured to have a spiral edge as denoted by reference numeral 115 which, in cooperation with a sector electrode having radial edges (not shown) on the stationary plate 118 provides a linear ramp output which provides an indication of the rotary or angular position of the plate 114.

Figure 11:
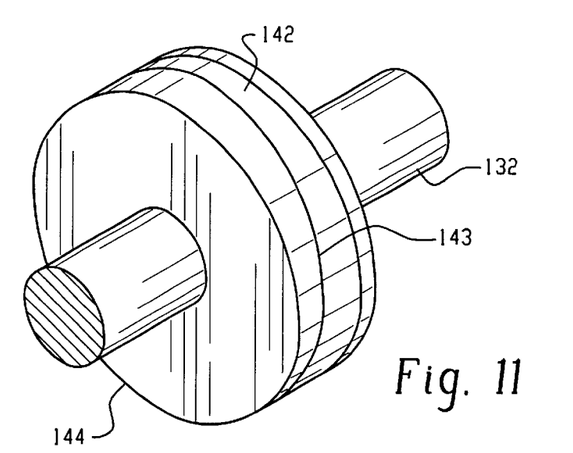
FIG. 11 is an axonometric view of the rotor electrode of FIG. 7 for indicating angular position; and, FIG. 12 is a block diagram of the signal processing for the rotary angle position sensing.

Referring to FIG. 11, the rotary plate 144 of the embodiment of FIG. 7 is illustrated wherein the electrode 142 has a helical or axial ramp edge 143 which provides an axially varying width to the electrode 142 and thus provides a linear ramp output or capacitive value to the capacitor as the plate 144 is rotated and thereby provides an electrical indication of the angular position of plate 144 with respect to the stationary ring 150. The capacitive coupling of the present invention thus includes an inherent provision for providing an electrical signal indicative of the angular or rotational position of the torsion member. It will be understood that the ramp surface electrode may alternatively be provided on the stationary electrode for the capacitor. It will also be understood that although the ramp electrode has been illustrated for only one of the capacitors that both capacitors may be so arranged to thus provide a signal which averages the change in capacitance of both capacitors either by vector summing techniques or ratioing.

Figure 12:
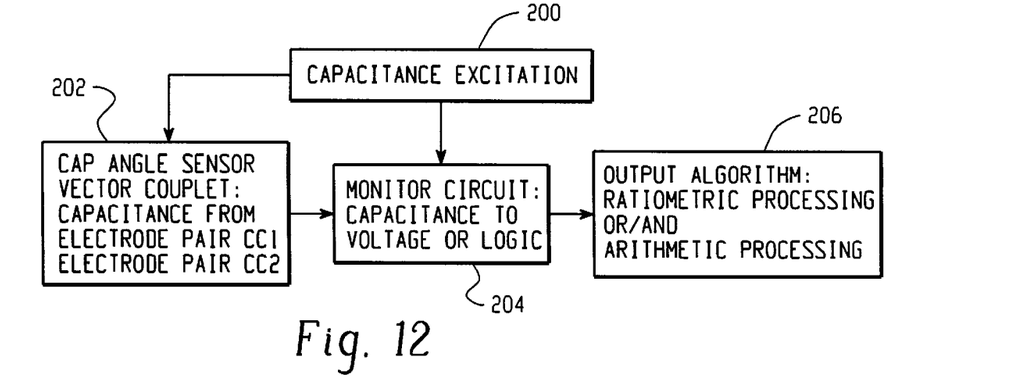

Referring to FIG. 12, a block diagram of the electrical signal processing for the angle position sensing is indicated wherein at step 200 the capacitors are excited by the piezoelectric element; and, at step 202, a vector couplet is formed of the capacitance from the first and second electrode pairs. At step 204 the monitor circuit or detection circuit converts the capacitance to voltage or digital logic. The voltage or logic from step 204 is then operated on by an algorithm of step 206 wherein the difference of the capacitances from the two electrode pairs is determined and employed as an indicator of angular position. Alternatively, the ratio of the capacitances of the two electrode pairs may be taken and used as an indication of angular position.

The present invention thus provides a unique and novel torque transducer utilizing a piezoelectric element having an axis of maximum strain sensitivity which is oriented at about 45 degrees to the axis of a torsion member subjected to an applied torque. The piezoelectric element is sandwiched between covers providing an air gap over the electrodes thereof by resilient spacers and is potted into a recess formed in the torsion member. The electrical leads from the piezoelectric element are coupled to an external stationary detection circuit by a rotary capacitive coupling which also serves as a rotary position angle sensor. The arrangement of the present invention advantageously offers a transducer which is simple to assemble, low in manufacturing cost, robust and provides a relatively high degree of torque sensitivity and signal resolution.

Although the invention has hereinabove been described with respect to the illustrated embodiments, it will be understood that the invention is capable of modification and variation and is limited only by the following claims.

What is claimed is:

1. A method of making a torque transducer comprising:
   (a) forming a prepared area on a surface of a torsion member adapted to be strained by an applied torque;
   (b) providing a piezoelectric element having an axis of maximum strain sensitivity and disposing first and second electrodes on opposite faces of said element, respectively, and attaching an electrical lead to each of the first and second electrodes,
   (c) connecting the electrical leads to said electrodes; and
   (d) disposing said element on said prepared area and orienting said sensitivity axis on said member and securing said element to said prepared area with a material selected from a group consisting of (i) adhesive material and (ii) potting material; wherein said step of disposing said piezoelectric element includes configuring said piezoelectric element in a plate-shaped configuration and disposing a resilient annular member on each opposite face of said plate-shaped element and overlaying each of said annular members with a protective cover.

2. The method defined in claim 1, wherein said step of forming said prepared area includes removing material and forming a recess.

3. The method defined in claim 1, wherein said step of forming said prepared area includes forming a recess in an end of a shaft.

4. The method defined in claim 1, wherein said step of forming said prepared area includes forming a recess on an outer surface of a shaft.

5. The method defined in claim 1, wherein said step of orienting said axis of maximum strain sensitivity includes orienting said axis at about 45 degrees to an axis of said applied torque.

6. The method defined in claim 1, further comprising capacitively coupling said electrical leads to an external detection circuit.

7. The method defined in claim 1, further comprising rotatively coupling an external detection circuit to said electrical leads with a capacitor.

8. The method defined in claim 1, further comprising capacitively coupling an oscillator circuit to said leads.

9. The method defined in claim 1, further comprising capacitively coupling to said leads and varying a capacitance thereof and indicating rotary angular position therewith.

10. A method of making a torque transducer comprising:
    (a) forming a prepared area on a surface of a torsion member adapted to be strained by an applied torque;
    (b) providing a piezoelectric element having an axis of maximum strain sensitivity and disposing first and second electrodes on opposite faces of said element, respectively, and attaching an electrical lead to each of the first and second electrodes,
    (c) connecting the electrical leads to said electrodes; and
    (d) disposing said element on said prepared area and orienting said sensitivity axis on said member and securing said element to said prepared area with a material selected from a group consisting of (i) adhesive material and (ii) potting material, wherein said step of disposing said piezoelectric element includes forming a subassembly comprising a piezoelectric wafer having said first and second electrodes disposed on each of said opposite faces thereof with an annular seal disposed each of said opposite faces with a protective cover over each seal.

11. A method of making a torque transducer comprising:
    (a) forming a prepared area on a surface of a torsion member adapted to be strained by an applied torque;
    (b) providing a piezoelectric element having an axis of maximum strain sensitivity and disposing first and second electrodes on opposite faces of said element, respectively, and attaching an electrical lead to each of the first and second electrodes,
    (c) connecting the electrical leads to said electrodes; and
    (d) disposing said element on said prepared area and orienting said sensitivity axis on said member and securing said element to said prepared area with a material selected from a group consisting of (i) adhesive material and (ii) potting material, wherein said step of disposing said piezoelectric element includes disposing a resilient annular seal member on each opposite face of said piezoelectric element and overlaying each of said seal members with a cover of polytetrafluoroethylene (PTFE) material.

* * * * *